United States Patent [19]
Robbins

[11] 3,914,048
[45] Oct. 21, 1975

[54] GRAPHIC PRINTER

[76] Inventor: Daniel H. Robbins, 35 Schoolhouse Lane, Rochester, N.Y. 14618

[22] Filed: July 29, 1965

[21] Appl. No.: 475,638

[52] U.S. Cl. .......... 355/66
[51] Int. Cl.[2] .......... G03B 21/00; G03B 27/32
[58] Field of Search .......... 88/24 (31), 24 (23)

[56] References Cited

UNITED STATES PATENTS

| | | | |
|---|---|---|---|
| 2,663,232 | 12/1953 | Drillick | 88/24 |
| 2,940,358 | 6/1960 | Rosenthal | 88/24 |
| 3,052,155 | 9/1962 | Hurin et al. | 88/24 |

*Primary Examiner*—Norton Ansher
*Assistant Examiner*—W. A. Sivertson

[57] ABSTRACT

An optical system for selectively positioning one of a pair of optical elements at the optical axis of a photolithographic platemaking system to readily produce either "right reading" or "wrong reading" images upon the imaging plane containing the photolithographic material.

5 Claims, 3 Drawing Figures

GRAPHIC PRINTER

Figure 1:
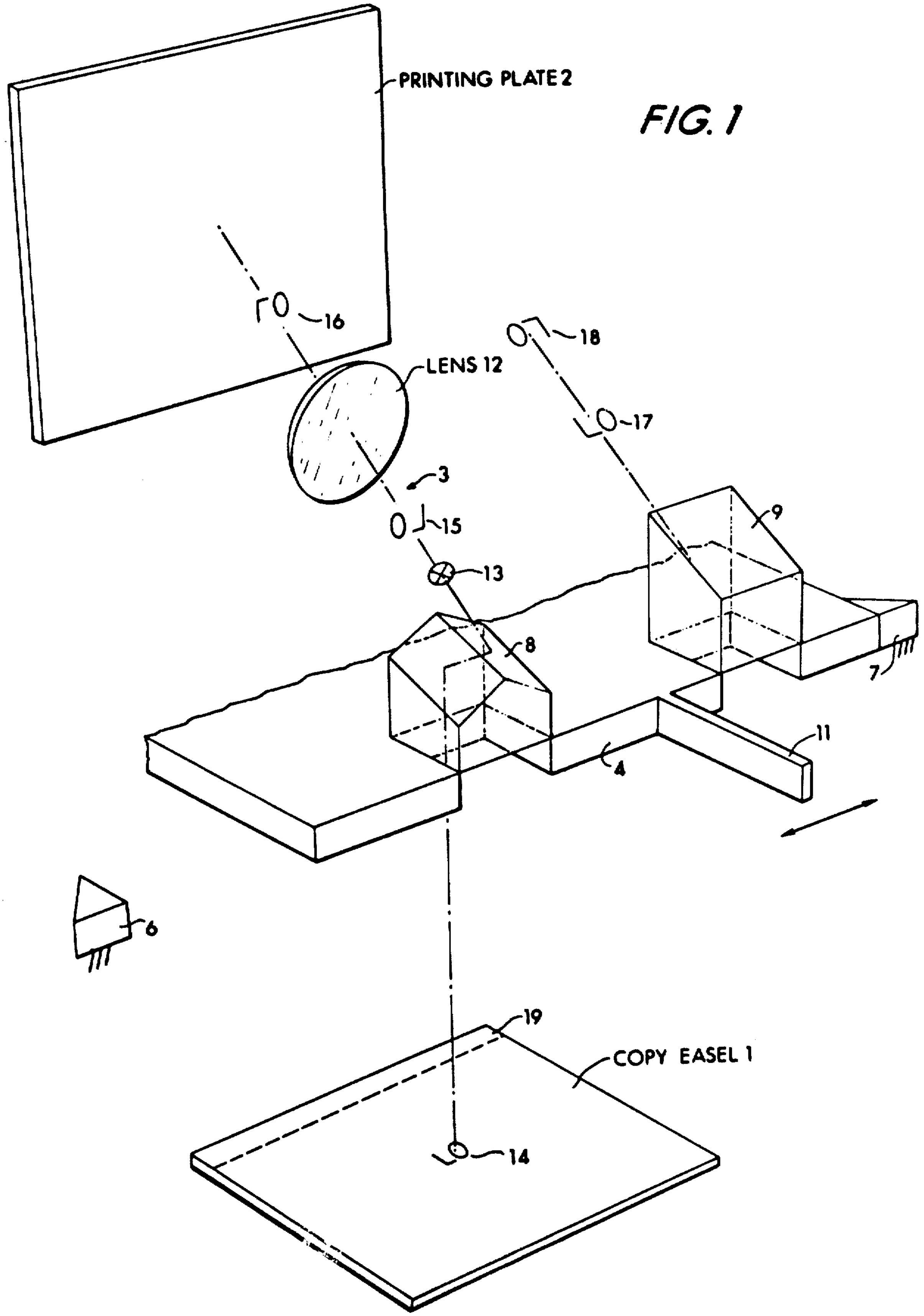

The present invention relates to graphic printers, and more particularly to graphic printers for printing material illuminated on a copy easel.

In the printing field, where it is desirable to print both sides of a page simultaneously, a pair of plates, one right reading and one wrong reading, coact with the page. One common mode of operation is to provide a first roller having a right reading and wrong reading plate carried thereon. The right reading plate transfers a wrong reading image upon a second blanket roller which stores the image until the wrong reading plate mounted upon the first roller arrives at the bite between the two rollers. The page is introduced into the bite of the rollers and the wrong reading plate upon the first roller transfers a right reading image on one side of the page, whereas the blanket roller carrying the wrong reading image transfers a right reading image upon the other side of the page. In certain types of photocopiers, such as those marketed under the trademark "Itek Platemaster," by Itek Corporation, original copy to be photographically printed on a printing plate is positioned upon an illuminated horizontal copy easel. The optical image of the copy is diverted 90° and focused upon the printing plate, the plane of which is orthoginal with the easel plane. A shutter is thereafter actuated thereby to register the image of the indicia on the copy easel upon the printing plate. A fresh plate thereafter receives the image of fresh copy positioned on the easel. In view of the aforesaid need for the alternate production of right reading and wrong reading plates to print on both sides of a page, it is desirable to provide a photocopier which alternately produces right reading and wrong reading printing plates so that a resulting pile of these plates may be directly supplied to a printing press.

Accordingly, it is a principal object of the present invention to provide a new and improved graphic printer.

It is a further object of the present invention to provide a new and improved graphic printer which selectively produces right reading and wrong reading plates with great ease.

It is a further object of the present invention to provide a new and improved graphic printer capable of selectively printing in a wrong reading mode or in a right reading mode and having balanced illumination between these modes.

It is yet a further object of the present invention to provide a new and improved graphic printer which may readily produce a group of printing plates which are alternately right reading and wrong reading.

Other objects and advantages of the present invention will become apparent as the following description, taken in conjunction with the figures, proceeds.

In accordance with the present invention, an optical system is provided including an illuminated copy easel, an optical axis, a printing plate, a shutter and a focusing lens for focusing an optical image of indicia positioned upon the copying easel on the printing plate. Means are provided for selectively positioning a first optical device in the optical axis such as a 45° diverting prism, or a second optical device in the optical axis such as an Amici roof prism. The first optical device perverts the image once or an odd number of times while the second optical device perverts the image twice or an even number of times. If an image is perverted twice, the resulting image is non-perverted. Since the focusing lens merely rotates the images applied thereto 180°, and does not pervert them, it follows that the printing plate will be right reading or wrong reading depending upon which optical device is positioned within the optical axis. Additionally, since the first device generally has one less reflecting surface than the second device, the reflectance of the surface of the first device is intentionally reduced relative to the reflectances of the surfaces of the second device, thereby to provide balanced illumination of the printing plate.

FIG. 1 discloses a copy easel 1, a printing plate 2, and an optical axis 3 communicating between them. A slidable base member 4 is positioned between stops 6 and 7 and is supported by a frame structure, not shown, and Amici roof prism 8 and a 45° diverting prism 9 are mounted upon movable base member 4 as shown. These prisms are well known to those skilled in the art and are disclosed and described on pages 38–40 of Sears, Principles of Physics III, Addison Wesley, 1946. A handle 11 is provided so that the operator may position prism 8 or 9 in optical axis 3 thereby to selectively produce wrong reading or right reading impressions upon printing plate 2. Focusing lens 12 and shutter 13 are positioned along optical axis 3 as schematically disclosed.

Indicia such as printed material is positioned upon copy easel 1. With the base member in the position shown, roof prism 8 causes a wrong reading impression to be manifested upon printing plate 2. It should be apparent that since roof prism 8 presents two reflecting surfaces, a particular image will be perverted twice so that these rays will print reading as would be the case where the indicia on the easel were contact printed. On the other hand, a single perversion would result in a right reading impression. The foregoing may be readily verified by tracing rays manifesting the image 14 through the system. Image 14 would emerge from prism 8 and would appear as image 15, which is inverted 180° by lens 12, to appear as image 16, to in turn cause a wrong reading impression to be made upon plate 2. Where prism 9 is positioned in the optical axis, image 14 would produce image 17 on the near side of the lens and 18 on the far side of the lens, which produces a right reading impression.

Since light rays from portion 19 of copy easel 1 may strike the prism at less than the critical angle, total internal reflection cannot be relied upon and thus the sloping surfaces of the prisms are mirrored. This is accomplished so that the total reflectance of each prism is balanced. For example, where the reflectance of each mirrored sloping surface of prism 8 is 95% the reflectance of the sloping surface of prism 9 is designed to be (0.95 × 0.95) or 90.25%.

Additionally, it is quite important that the lengths of the glass paths through the two prisms are made equal so that the copy images are focused regardless of which prism is placed in the optical axis.

Figure 2:
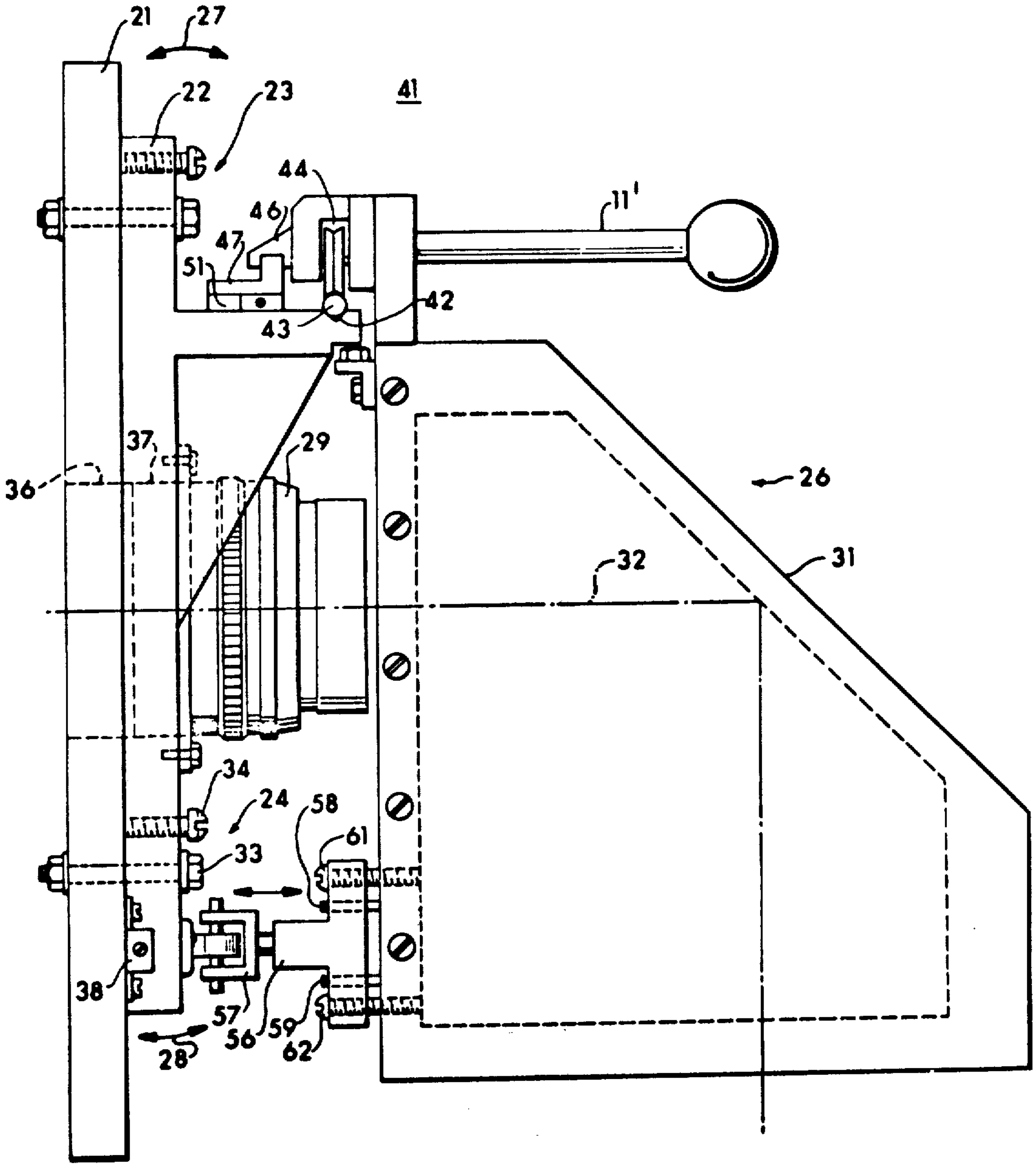
Figure 3:
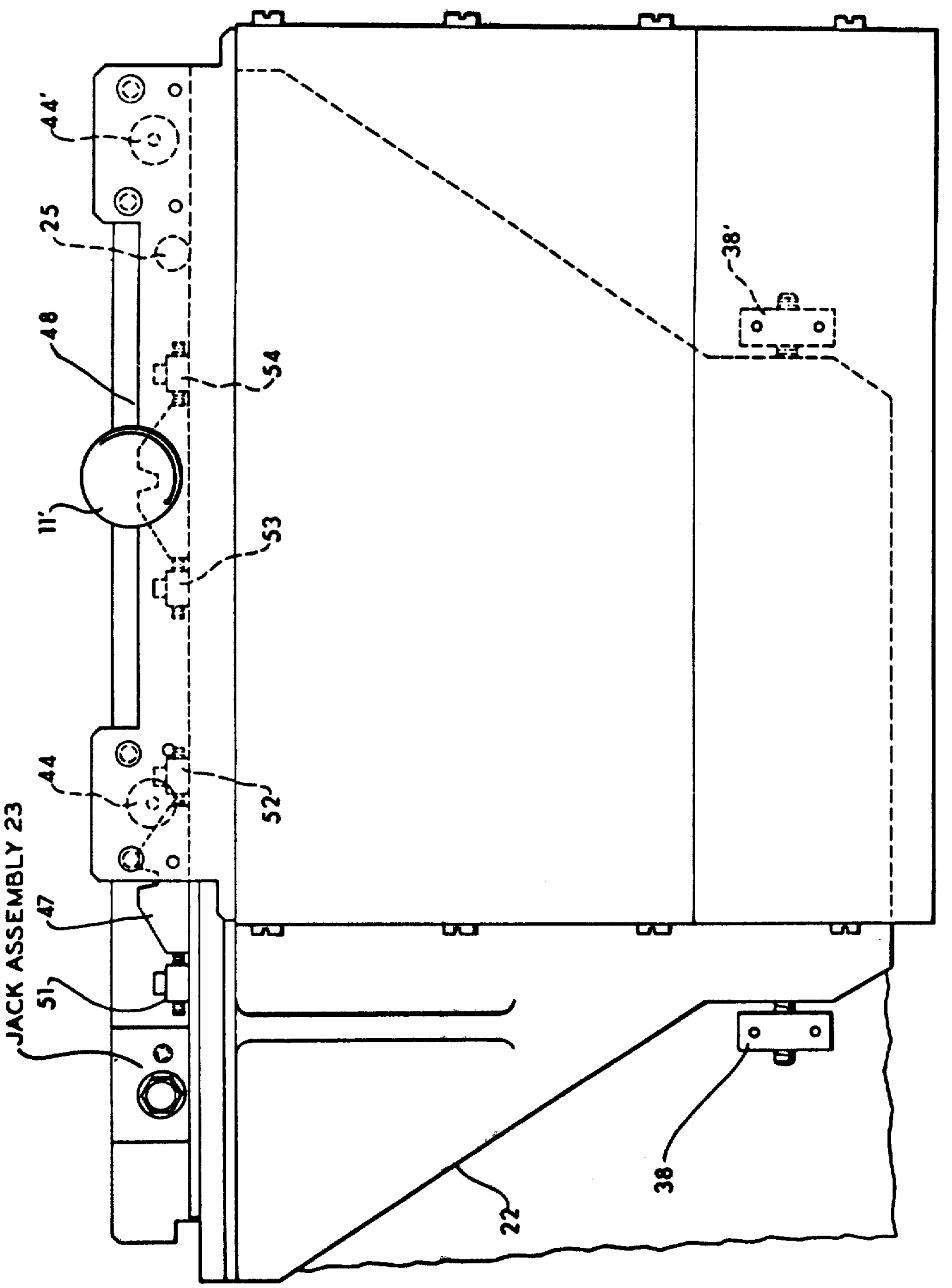

FIG. 2 discloses a side view of a portion of the Dual Prism Projection Printer embodying the present invention. A base plate 21, which is vertically oriented as shown, is affixed to mechanical ground. A support assembly 22 is mechanically coupled to base plate 21 by means of jack screw assemblies 23 and 24. A third jack screw assembly 25 is positioned in line with jack screw assembly 23 as shown in FIG. 3. These three jack screw assemblies may be individually adjusted to selectively position the support assembly 22 in the direction indicated by arrows 27 and 28, thereby to provide for three dimensional adjustment of the plane of support plate 22 with respect to the plane of fixed base plate 21. Since lens assembly 29 and prism support frame 31 are mounted upon support assembly 22, it follows that the adjustment of the three jack assemblies will alter the orientation in space of the prisms and lens assembly with respect to fixed base assembly 21.

Let it be assumed that optical axis 32 should be raised slightly to cause it to assume an exact horizontal position. Lock or hold screw 33 of jack screw assembly 24, which passes through an enlarged hole bored within support assembly plate 22 and base plate 21, is loosened. Jack screw 34 is rotated clockwise while it bears against the front surface of base plate 21 to cause the entire support assembly 22 to be slightly rotated, or lifted, so as to level up optical axis 32 with respect to the horizontal. Hold Screw 33 is thereafter tightened. If desired, each hold screw associated with each jack assembly would be simultaneously loosened and the adjustments indicated by arrows 27 and 28 would be simultaneously made by actuating the three jack screws so that the entire planar surface of support assembly 22 could be properly oriented with respect to the frame of the machine. Annular ring shaped stud member 36 is affixed to base plate 21 and is fitted into a cylindrical bore recess 37 formed within support assembly 22. In order to rotate and "square up" the prisms, adjustable screw stops 38 and 38' shown in both FIGS. 2 and 3 can be adjusted in "push-pull" fashion to rotate support plate assembly 22 about stud 36 and optical axis 32 in view of the fact that the holes containing the lock screws of the jack assemblies, are oversized.

Both prisms 8 and 9 are mounted within prism housing 31 which is mounted upon support plate assembly 22 by carriage assembly 41. The horizontal portion of support plate assembly 22 has a v-shaped groove 42 formed within its upper surface which groove contains a rod 43 which functions as a rail member upon which rollers 44 and 44' of carriage assembly 41 ride. Roller 44 shown in FIG. 2 supports the left hand portion of carriage 41 while roller 44' shown in FIG. 3 supports the right hand portion of carriage assembly 41. Intermediate the two rollers a movable catch assembly 46 actuated by handle 11' coacts with detent members 47 and 48, thereby to selectively position the prisms at the optical axis. In other words, catch member 46 is raised and lowered thereby to respectively unlock and lock the carriage assembly 41. For example, should it be desired to position prism 9 at the optical axis of the system, handle 11' is actuated to cause catch 46 to be raised out of the notch of detent member 48. The operator thereafter pushes the handle to the left until catch member 46 is dropped into the notch of detent 47 thereby to cause prism 9 to be placed within the optical axis of the system. It is important that prisms 8 and 9 be exactly centered about the optical axis after they are selectively positioned. For example, when penta roof prism 8 is positioned at the optical axis as illustrated in FIG. 1, the peak of the prism should be aligned with the optical axis. In order to effect this centering, adjustable detent stops 51, 52, 53 and 54, best shown in FIG. 3, are adjusted in "push-pull" fashion by rotation of the screw members forming the movable portion thereof.

It is important that adjustment of the prism housing 31 with respect to support plate assembly 22 be provided independently of the aforesaid adjustments. Since the center of gravity of the carriage assembly and prism housing lies to the right of a vertical line through the rail and roller portions, and since the carriage assembly is pivotably mounted upon rail member 43, jack assembly 56 and roller member 57 will be placed in compression so as to support the prism housing as shown in FIG. 2. Roller member 57 bears against a bearing surface of support plate assembly 22 as shown in the FIG. 2 so that the entire prism housing may be readily moved laterally as mentioned hereinabove. Should it be desirable to "square up" prism housing 31 independently of the aforesaid adjustments, compression member jack screws 58 and 59 are actuated, after loosening locking or holding screws 61 and 62, just as mentioned hereinbefore in connection with the adjustment of jacking assemblies 23, 24 and 25. That is, in order to pivot prism housing or support frame 31 in counterclockwise fashion about rail 43, jack screws 58 and 59 would be rotated so as to slightly increase the effective length of jack assembly 56.

In view of the various mechanisms described hereinabove, an extremely flexible system is provided for producing exact orientation in space of prism 8 and 9 thereby to easily provide for extremely accurate imaging of viewed copy upon the printing plate.

It should be understood that the actuation of movable base member 4 need not be manual but could be solenoid actuated, or otherwise automatically controlled.

While there has been described what is at present considered to be the preferred embodiment of this invention, it will be obvious to those skilled in the art that various changes and modifications may be made therein without departing from the invention, and it is, therefore, intended in the appended claims to cover all such changes and modifications as fall within the true spirit and scope of the invention.

What is claimed is:

1. A photographic printing system comprising:

a. a copy easel for supporting indicia thereon;

b. a printing plate for printing an image of said indicia;

c. an optical system having a first and second state for presenting images of said indicia perverted an odd number of times to said printing plate when said optical system is in said first state and for presenting images of said indicia perverted an even number of times to said printing plate when said optical system is in said second state; and d. control means for selectively causing said optical system to assume said first state or in the alternative to assume said second state;

said optical system including a first set of reflecting surfaces having an odd number of reflecting surfaces and a second set of reflecting surfaces having an even number of reflecting surfaces, the reflectance of at least one of the individual reflective surfaces of said first set of reflecting surfaces being less than the reflectance of at least one of the individual reflective surfaces of said second set so that the composite reflectances of each set are balanced.

2. A photographic printing system comprising:

a. a copy easel for supporting indicia thereon;

b. a printing plate for printing an image of said indicia;

c. a movable control member movable to assume a first position or a second position;

d. optical means coupled to said movable control member for projecting a perverted image of said indicia to said printing plate when said control member is in said first position and for presenting a non-perverted image of said indicia to said printing plate when said control member is in said second position; and e. said control member further including a support structure having a first and second detent member coupled thereto, a carriage for carrying said optical means, a rail portion formed upon said support structure for supporting said carriage, a movable catch mounted upon said carriage having a first position wherein said catch assumes a non-operative relationship with said detent members and having a second position wherein said catch assumes an operative relationship with one of said detent members thereby to fix the position of said carriage relative to said support structure;

said support structure further including a first fixed support plate, a second plate, and means for providing relative rotational movement between said first fixed support plate and said second plate.

3. The combination as set forth in claim 2 further including means for changing the position of the plane of said second plate relative to the plane of said first plate.

4. A photographic printing system comprising:

a. a copy easel for supporting indicia thereon;

b. a printing plate for printing an image of said indicia;

c. a movable control member movable to assume a first position or a second position;

d. optical means coupled to said movable control member for projecting a perverted image of said indicia to said printing plate when said control member is in said first position and for presenting a non-perverted image of said indicia to said printing plate when said control member is in said second position;

e. support structure having a first and second detent member coupled thereto;

f. a carriage for carrying said optical means;

g. an elongated rail portion extending in a given direction and formed upon said support structure for supporting said carriage;

h. a movable catch mounted upon said carriage having a first position wherein said catch assumes a non-operative relationship with said detent members and having a second position wherein said catch assumes an operative relationship with one of said detent members thereby to fix the position of said carriage relative to said support structure;

i. an elongated handle positioned transverse to said given direction of extension of said elongated rail portion and mechanically coupled to said carriage and to said movable catch for actuating said movable catch between said first and second positions and for translating said carriage along the given direction of extension of said rail portion; and j. means for angularly positioning said carriage about said rail within the given narrow angular range.

5. The combination as set forth in claim 4 wherein said means for angularly positioning comprises:

a compression member, a roller affixed to said compression member for partially supporting said carriage against said support structure, and means for changing the effective length of said compression member for rotating said carriage about said rail portion within said given narrow angular range.

* * * * *